(12) United States Patent
Knight

(10) Patent No.: US 11,059,651 B2
(45) Date of Patent: Jul. 13, 2021

(54) THERMALLY INSULATED CONTAINER

(71) Applicant: LAMINAR MEDICA LIMITED, Tring Hertfordshire (GB)

(72) Inventor: Philip Knight, Tring Hertfordshire (GB)

(73) Assignee: LAMINAR MEDICA LIMITED, Tring Hertfordshire (GB)

( * ) Notice: Subject to any disclaimer, the term of this patent is extended or adjusted under 35 U.S.C. 154(b) by 426 days.

(21) Appl. No.: 16/305,765

(22) PCT Filed: May 30, 2017

(86) PCT No.: PCT/GB2017/051531
§ 371 (c)(1),
(2) Date: Nov. 29, 2018

(87) PCT Pub. No.: WO2017/207974
PCT Pub. Date: Dec. 7, 2017

(65) Prior Publication Data
US 2020/0317423 A1 Oct. 8, 2020

(30) Foreign Application Priority Data

May 31, 2016 (GB) .................................... 1609489

(51) Int. Cl.
*B65D 81/38* (2006.01)
*F25D 3/08* (2006.01)

(52) U.S. Cl.
CPC ....... *B65D 81/382* (2013.01); *B65D 81/3816* (2013.01); *B65D 81/3818* (2013.01); *F25D 3/08* (2013.01); *F25D 2303/0831* (2013.01)

(58) Field of Classification Search
CPC ........ B65D 5/566; B65D 5/0281; B65D 3/22; B65D 81/00–382; B65D 81/3816;
(Continued)

(56) References Cited

U.S. PATENT DOCUMENTS

| 5,709,914 A * | 1/1998 | Hayes | ....................... B32B 5/24 |
| | | | 428/35.1 |
| 7,240,513 B1 * | 7/2007 | Conforti | ................ A45C 13/02 |
| | | | 62/457.2 |

(Continued)

OTHER PUBLICATIONS

International Search Report for Application No. PCT/GB2017/051531 dated Oct. 7, 2017.

*Primary Examiner* — Kareen K Thomas
(74) *Attorney, Agent, or Firm* — von Briesen & Roper, s.c.

(57) ABSTRACT

The present invention provides a thermally insulated shipping container comprising a thermally insulating layer defining a first void, a main layer containing phase change material (main PCM layer) within the first void and defining a second void within the first void, a barrier layer containing phase change material (barrier PCM layer) within the second void and distinct from the main PCM layer, the barrier PCM layer defining a third void within the second void, the container being arranged to receive a product for transportation inside of the third void, wherein the main PCM layer has an average thickness greater than the average thickness of the barrier PCM layer, the barrier PCM layer comprises of an envelope in which the phase change material of the barrier PCM layer is contained and the barrier PCM layer is configured to maintain the phase change material with a relatively even distribution within the envelope.

15 Claims, 2 Drawing Sheets

(58) Field of Classification Search
CPC B65D 81/3818; B65D 81/38; B65D 81/3813; F25D 3/00–08; F25D 2303/00–0831
See application file for complete search history.

(56) References Cited

U.S. PATENT DOCUMENTS

| | | | |
|---|---|---|---|
| 8,695,373 B1 | 4/2014 | Patton | |
| 9,688,454 B2* | 6/2017 | Ranade | B32B 5/18 |
| 9,981,797 B2* | 5/2018 | Aksan | B65D 77/042 |
| 2002/0040564 A1* | 4/2002 | Killingbeck | F25D 3/06 |
| | | | 53/416 |
| 2004/0079794 A1* | 4/2004 | Mayer | B65D 81/3816 |
| | | | 229/103.11 |
| 2004/0151854 A1 | 8/2004 | Pecorini et al. | |
| 2004/0231355 A1* | 11/2004 | Mayer | F25D 3/06 |
| | | | 62/371 |
| 2005/0150244 A1* | 7/2005 | Hillmann | B65D 81/386 |
| | | | 62/371 |
| 2010/0064698 A1* | 3/2010 | Schabron | F25D 3/08 |
| | | | 62/62 |
| 2010/0314397 A1* | 12/2010 | Williams | B65D 81/3823 |
| | | | 220/592.01 |
| 2011/0083826 A1 | 4/2011 | Matta et al. | |
| 2012/0305435 A1* | 12/2012 | Matta | B65D 81/3862 |
| | | | 206/521 |
| 2014/0021208 A1* | 1/2014 | Anti | A01N 1/0273 |
| | | | 220/592.25 |
| 2014/0151382 A1* | 6/2014 | White | B65D 81/3862 |
| | | | 220/592.2 |
| 2014/0331711 A1 | 11/2014 | Blezard et al. | |
| 2015/0166244 A1* | 6/2015 | Wood | B31B 50/74 |
| | | | 220/592.25 |

* cited by examiner

THERMALLY INSULATED CONTAINER

CROSS-REFERENCE TO RELATED APPLICATION

This Application is a 35 USC § 371 US National Stage filing of International Application No. PCT/GB2017/051531 filed on May 30, 2017, and claims priority under the Paris Convention to Great Britain Patent Application No. 1609489.8 filed on May 31, 2016.

FIELD OF THE INVENTION

The present invention relates to thermally insulated containers and particularly, but not exclusively, to passive insulated shipping containers of the type used for transporting medicinal products, or the like, which have to be maintained during transportation at a relatively constant low temperature but above freezing, typically in the range of 2 to 8° C. This is necessary to prevent the product from being damaged, or its shelf life being reduced relatively to the shelf life stated on the product.

BACKGROUND OF THE INVENTION

Passive insulated shipping containers typically comprise an insulated container comprising an insulating outer casing which is lined with, or houses, a number of cool blocks, cool trays, gel packs, cool bricks or similar, which for the purposes of the present specification are collectively referred to as cool packs. These may be cooled until a phase change occurs in the phase change material in the cool packs, from a liquid to a solid, so that the subsequent phase change back from a solid to a liquid acts to maintain the contents of the container at a constant temperature. Examples of materials which change state from a solid to a liquid to produce a cooling effect are paraffin wax and water-based solutions.

Passive insulated shipping containers may comprise a container having three layers, an outer insulating layer, typically formed from expanded foam, an inner layer of cool packs and an intervening layer between the outer and inner layers made up of a number of vacuum insulation panels to provide enhanced insulation. The container may further comprise an outer casing to provide protection for the outer insulating layer during transportation and/or an inner lining.

Regardless of the particular construction of a passive insulated shipping container, most utilise the above described cool packs and the phase change that occurs in the material in these, to maintain the product at the correct temperature during transportation. This normally requires that the cool packs be chilled separately from the container in order for the phase change to occur, to charge the cool packs ready for use. If the cool packs are chilled at 0° C. or a few degrees below then the time for which they require to be chilled, thus the storage space required to chill them, is far greater than it would be if they were chilled, for example, at −18° C. However, when the cool packs are chilled at such low temperatures, before the cool packs can be used it is first normally necessary that they be brought up to about 0° C., for otherwise inserting these directly into a container and then inserting product in that container could result in a product (at least locally) being chilled to below 0° C. (or some other temperature at which the product would be destroyed).

When using cool packs in passive insulated shipping containers, as described above, cool packs are normally chilled to about −18° C. and then brought back up to typically 5° C., prior to packing. This normally involves double handling of the cool packs, first chilling them to −18° C. and then subsequently bringing them up to 5° C. and arranging suitable storage for them. This is time consuming and may also result in cool packs not being available for use at short notice.

SUMMARY OF THE INVENTION

According to the present invention there is provided a thermally insulated container comprising a thermally insulating layer defining a first void, a main layer containing phase change material (main PCM layer) within the first void and defining a second void within the first void, a barrier layer containing phase change material (barrier PCM layer) within the second void and distinct from the main PCM layer, the barrier PCM layer defining a third void within the second void, the container being arranged to receive a product for transportation inside of the third void, wherein the main PCM layer has an average thickness greater than the average thickness of the barrier PCM layer and being characterised in that the barrier PCM layer comprises of an envelope in which the phase change material of the barrier PCM layer is contained and the barrier PCM layer is configured to maintain the phase change material with a relatively even distribution within the envelope.

The present invention provides a barrier PCM layer between the main PCM layer and the product. This barrier PCM layer may be relatively thin compared to the main PCM layer and it may be stored at room temperature. The barrier PCM layer provides a barrier between the main PCM layer and a product inserted into the container and may permit the PCM layer, possibly in the form of cool packs, to be inserted into the container at −18° C., or some other temperature below the temperature at which is desired that the product be transported. Alternatively, the container with the main PCM layer installed in it, could be chilled to −18° C., or some other temperature below the temperature at which the product is to be transported. In either case, the barrier PCM layer may be arranged to have a volume and latent heat of fusion to bring the main PCM layer up to the temperature at which the main PCM layer starts to change phase, which may be in the range 0 to 8° C. An advantage of this is that it permits cool packs of a main PCM layer, chilled to −18° C. or similar, to be immediately placed with the barrier PCM layers (possibly stored at room temperature) and the product into the container for shipment, whilst ensuring the product does not drop below a specified temperature. This permits a thermally insulated container be prepared for use at short notice and also avoids double handling of the main PCM layer.

The provision of the barrier PCM layer need not add to the overall mass of PCM material within a container. The barrier PCM layer and the phase change material therein, will itself become "charged", (in providing energy to the main PCM layer) and will thus then subsequently absorb energy and thus act to maintain the product at the desired temperature. This will thus reduce the quantity of PCM material required for the main PCM layer. Alternatively, the additional barrier PCM layer will add to the performance of the container, for in transferring energy to the main PCM layer, the barrier PCM layer will subsequently be able to absorb energy entering the container, thus increase the performance of the container.

With the present invention, the barrier PCM layer comprises an envelope in which the phase change material of the barrier PCM layer is contained and the barrier PCM layer is configured to maintain the phase change material evenly distributed within the envelope. By arranging for the barrier PCM layer to maintain the phase change material with a relatively even distribution within the envelope, it is possible for the envelope to be both relatively thin and to be flexible, whilst still maintaining an even distribution of the phase change material and thus protecting the product from local damage from the adjacent main PCM layer.

In one aspect of the invention, the envelope is advantageously formed from two sheets of flexible material bonded (which term includes adhering, welding or any other similar joining technique) together to divide the envelope into the plurality of discrete pockets. This provides both a relatively easy and economical way of forming the barrier PCM layer and may provide a flexible PCM barrier layer which may easily be placed around a product or which may be used to line a void formed by the main PCM layer, into which a product is to be placed.

The provision of a flexible envelope is particularly advantageous because, unlike the main PCM layer which in use will be rigid due to the PCM layer being in a solid phase, the phase change material of the barrier PCM layer will be in its liquid phase when the barrier PCM layer is placed in the container. Thus, if the envelope is flexible, it will be possible to line the void in the container with it, the envelope conforming to the sides of the void and thus minimising the space occupied by the envelope. Additionally, the envelope may be folded, permitting a single envelope to line multiple sides, base or top of the void in the container.

As an alternative to the above arrangement, or in addition thereto, the barrier PCM layer may be configured to maintain the phase change material with a relatively even distribution within the envelope, by further comprising a capillary sheet within the envelope, which capillary sheet is formed of a material which exhibits a capillary action on the phase change material within the envelope. In this manner the capillary sheet may ensure an even distribution of the phase change material within the envelope, or within pockets of the envelope, of the PCM barrier layer, again avoiding the requirement that the barrier PCM layer comprise cool packs, or similar, which are retained in position by being rigid.

Preferably the capillary sheet within the envelope is between 5 mm and 10 mm thick. This may be arranged to hold sufficient phase change material to absorb any thermal shock which would otherwise be imposed on a product by chilled cool packs of the main PCM layer, whilst not being of a sufficient thickness to prevent the barrier PCM layer being flexible. Again, the envelope may preferably be formed from two sheets of flexible material bonded together and with the capillary sheet therein.

The main PCM layer may comprise one or more cool packs containing phase change material, which cool packs are formed of a different material to the material of the envelope and which are substantially more rigid than the envelope. The relatively rigid cool packs of the main PCM layer ensures that the cool packs maintain an appropriate shape when the liquid PCM material within them solidifies. This is necessary to ensure that they can then be appropriately arranged within the container. However, as mentioned above, this is not necessary in the case of the envelope, for any phase change from a liquid to a solid of the phase change material within the envelope, will only occur only after the envelope has been installed within the container.

The main PCM layer preferably comprises a plurality of cool packs each containing phase change material, which cool packs are formed of a different material to the envelope and are substantially more rigid than the envelope, with packs corresponding to each of four sides and a base of the container. In this way the packs of the main PCM layer can be used to define the void in which the flexible envelope of the barrier PCM layer is to be inserted.

Preferably, at least some cool packs of the main PCM layer are separate from each other. However, some cool packs may be joined together to assist in assembly within the container.

The barrier PCM layer may comprise at least four joined together envelopes, one corresponding to each of the four sides of the container, it may comprise five joined together envelopes, one corresponding to each other four sides and the base of the container, or it may comprise six joined together envelopes, one corresponding to each of the four sides of the container, one to the base and one to the lid of the container. In this last case, because the barrier PCM layer is flexible, a product may subsequently be inserted into the container by the envelope forming a lid of the barrier PCM layer being folded open to permit the product to be loaded.

Each of the envelopes may be formed separately and subsequently joined to an adjacent envelope by being welded or otherwise bonded to that envelope. Alternatively all the envelopes may be formed from two sheets of flexible material bonded together to define said envelopes, with the bonds forming living hinges to permit adjacent envelopes to be folded relative to each other to a shape substantially corresponding to that of the second void of the container. As a further alternative, a single envelope may be shaped to correspond to multiple sides, with the envelope then being folded to form appropriate panels to line the main PCM layer.

The two sheets of the envelope may be formed from vinyl and this, in one embodiment, may house a polyamide/polyethylene laminate pouch containing a capillary sheet and a phase change material, with the two vinyl sheets being bonded together by being heat or radio frequency welded.

The phase change material of the main PCM layer may be the same as the phase change material of the barrier PCM layer, in which case it is preferable the volume of the phase change material of the barrier PCM layer is between 8 to 36% (more preferably between 12% and 22%) of the volume of the phase change material of the main PCM layer. A ratio of the volumes in these ranges will normally be sufficient for the barrier PCM layer (at room temperature) to provide sufficient energy to increase the temperature of the phase change material of the main PCM layer from around −18° C. to above 0° C.

For the same reasoning and regardless of whether or not the phase change material of the PCM barrier layer is the same as the phase change material of the main PCM layer, it is preferable that the latent heat of fusion of the phase change material multiplied by the volume of the phase change material of the barrier PCM layer is between 8% and 36% (more preferably between 12% and 22%) of the latent heat of fusion of the phase change material multiplied by the volume of the phase change material of the main PCM layer.

The thermally insulated container may comprise a lining within the third void. The thermally insulating layer may comprise a layer of expanded foam or a layer of vacuum insulation panels or a combination of the two, normally with the vacuum insulation panels located inwardly of a layer of expanded foam. Additionally the container may comprise an outer, possibly corrugated, layer to provide protection to the thermally insulating layer.

According to a second aspect of the invention there is provided a method of transporting a product at a relatively constant temperature the method comprising the steps of obtaining a container in accordance with the invention as described above, chilling the main PCM layer to below −14° C., placing the barrier PCM layer at a temperature above 4° C. into the second void defined by the main PCM layer and placing product to be transported into the third void.

The method may further comprise chilling the main PCM layer to below −14° C. and subsequently inserting it into the second void of the container prior to inserting the barrier PCM layer. This may enable the barrier PCM layer to be inserted at room temperature.

BRIEF DESCRIPTION OF THE DRAWINGS

One embodiment of the present invention will now be described, by way of example only, with reference to the accompanying figures of which.

DETAILED DESCRIPTION OF THE INVENTION

Figure 1:
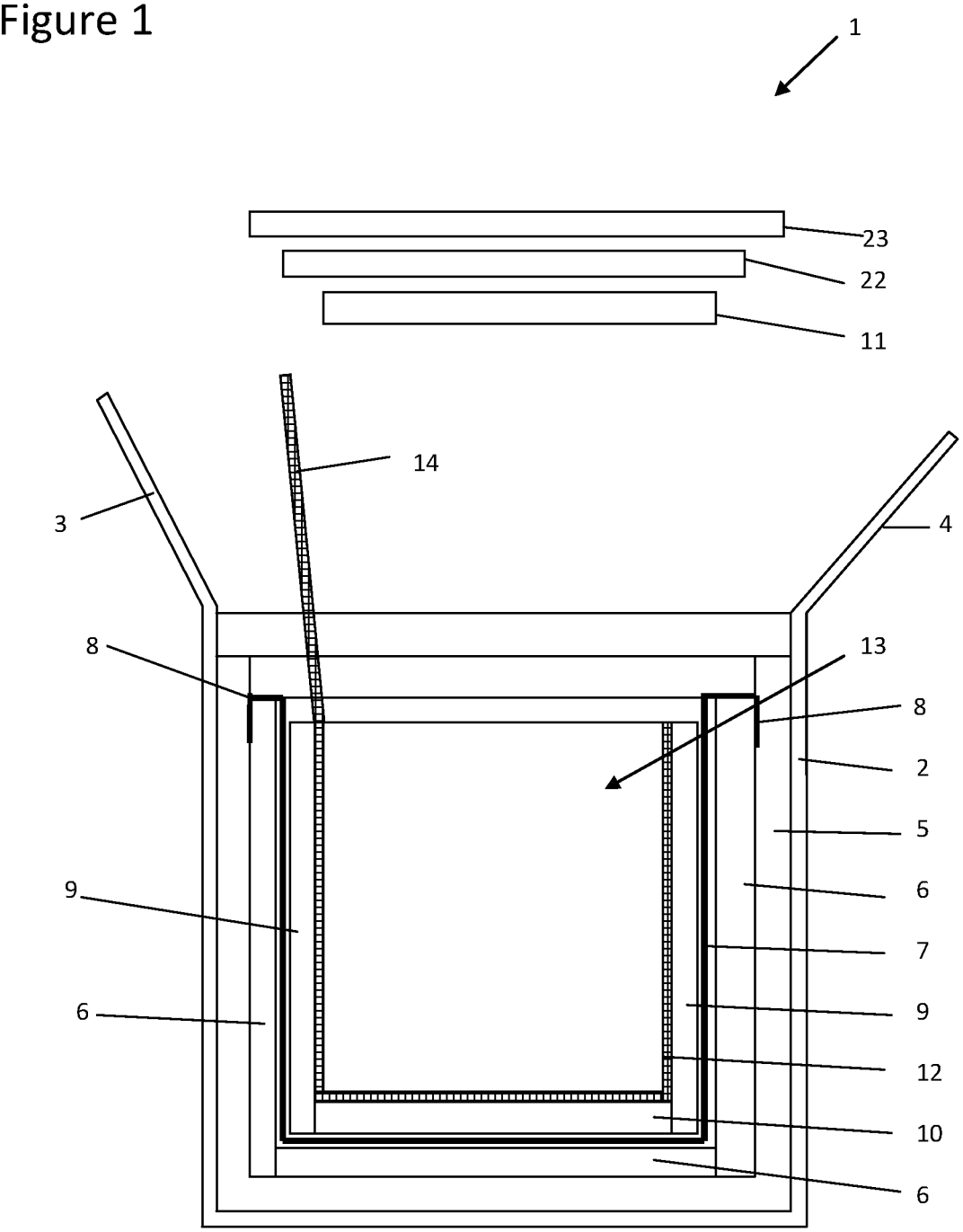
FIG. 1 is a sectional view through a thermally insulated shipping container in accordance with the present invention.

Referring to FIG. 1, this is a section through a thermally insulated shipping container, indicated generally as 1. The container of FIG. 1 has equivalent components lining all four walls and thus, with the exception of the lids 3, 4, and 14, a section taken orthogonal to the section shown in FIG. 1 will show equivalent components to those shown in FIG. 1.

The container 1 comprises an outer box 2 formed of corrugated board, for example corrugated cardboard or corrugated plastic, with two flaps 3 and 4 located on an upper edge of the box 2.

Inside the outer box 2 is a thermally insulating box 5, formed from moulded polystyrene, which thermally insulating box 5 is five sided with an open top. The four inner side walls and base of the thermally insulating box 5 may additionally be lined with vacuum insulation panels 6, to improve the thermal insulating performance of the container 1.

The vacuum insulation panels 6 are relatively delicate and easy to puncture and the container 1 has a clear plastic sheet 7 of, for example, amorphous polyethylene tetraphalate (a PET), to protect the vacuum insulation panels 6. This is formed in to the shape of five adjoining panels and is folded to line the faces of all the five vacuum insulation panels 6 within the container 1 and to fold over the upper edges, as shown at 8, and over the outer surfaces of the vacuum insulation panels 6 of the side walls of the container 1. The components thus far describe will normally be installed in the container 1 by the manufacturer.

The container additionally comprises a main layer of phase change material (main PCM layer) consisting of four wall cool packs 9 (only two of which are shown), a base cool pack 10 and a top cool pack 11. The top cool pack 11 is arranged to, in use, sit on and be supported by the top edges of the four wall cool packs 9. Each of the cool packs 9, 10, 11 comprises a rigid casing of high density polyethylene, filled with the phase change material Tetradecane.

The container 1 additionally comprises a barrier layer 12 of phase change material (barrier PCM layer), which may be in either one of the two alternative forms described below with reference to FIGS. 2 and 3. The barrier PCM layer 12 is preformed into six panels, as described below, so that it may be inserted into the void formed by the cool packs 9 and 10, so as to line all five inner surfaces of the cool packs 9 and 10 and to also form a lid portion 14, as shown. The inner surface of the barrier PCM layer defines a further void 13 in which a product (not shown) to be transported is to be placed.

Figure 2:
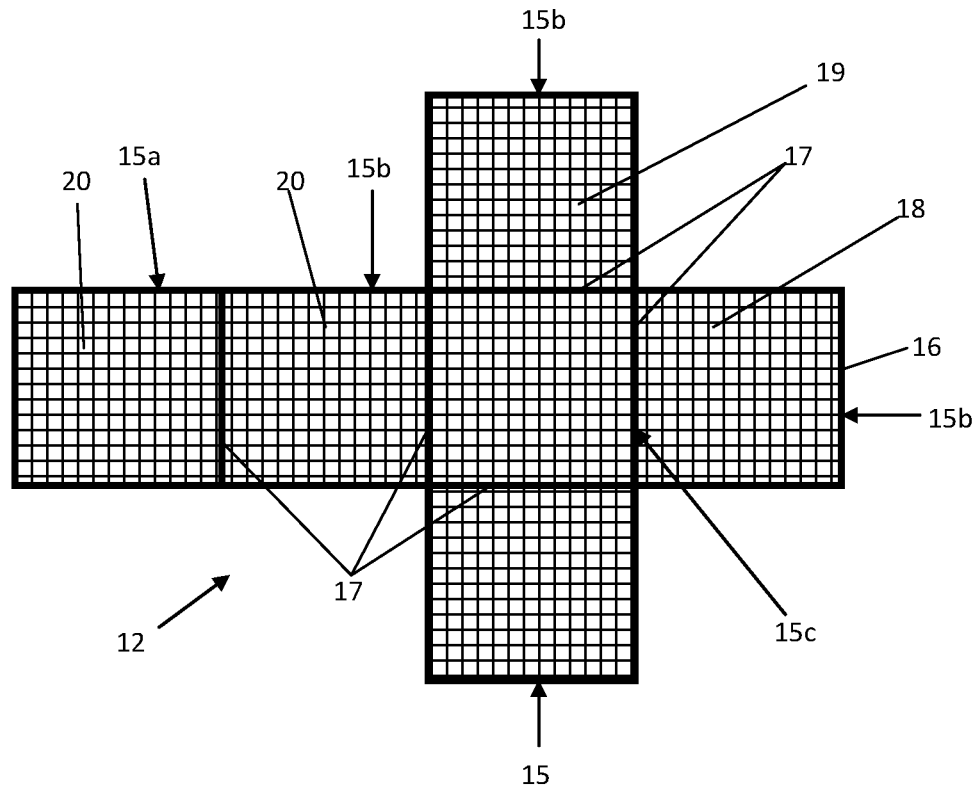
FIG. 2 is a plan view of a barrier PCM layer of the thermally insulated shipping container of FIG. 1.
Figure 3:
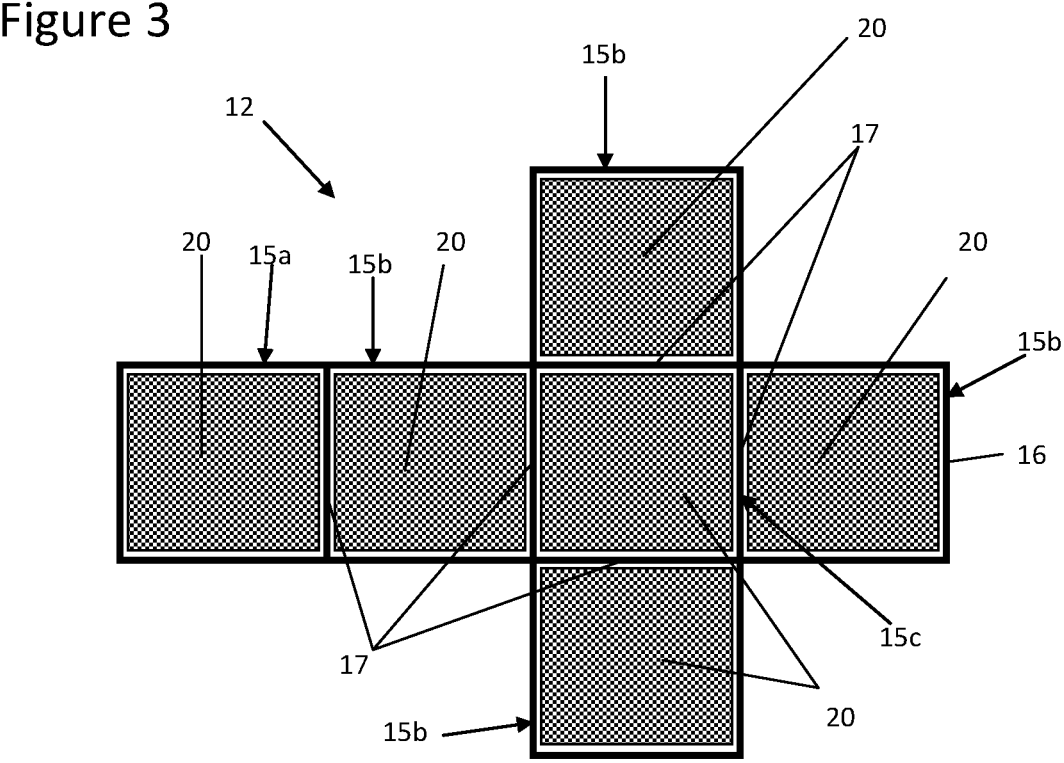
FIG. 3 is a plan view of an alternative barrier PCM layer of the thermally insulated shipping container of FIG. 1.

Referring now to FIGS. 2 and 3, the barrier PCM layer, indicated generally as 12 comprises two flexible sheets, each formed into a shape of a cross, as shown, so that together they may form six panels as indicated, one panel 15a forming the lid portion 14, four panels 15b forming wall portions and one panel 15c forming a base portion.

Although, in the embodiment shown in FIGS. 2 and 3, the barrier PCM layers are shown formed in the shape of a cross, it will be appreciated that they could be formed in any of a number of shapes, which could similarly be folded to line all six sides of the void formed by the cool packs 9, 10, 11. Also, the container 1 may not be generally square in shape, as illustrated in FIG. 1, but it could for example be rectangular. In this case the panels 15a, 15b and 15c of the barrier PCM layers 12, shown in FIGS. 2 and 3, may not all be the same size. In this case, the vacuum insulation panel 6 of FIG. 1 may also be of different sizes, as may the cool packs 9, 10, 11. Alternatively, multiple vacuum insulation panels or cool packs may be used on each of one or more pairs of opposite sides of the container.

With reference to FIG. 2, the barrier PCM layer 12 is formed by bonding two flexible sheets together to join them around their peripheral edge 16. This may be by any known technique and may be by heat or radio frequency welding. The envelope formed by the two laminated sheets may then be filled with the phase change material Tetradecane.

The filled envelope is may then be further bonded, again by any known technique which may be by heat or radio frequency welding, to form living hinges 17 which define the six panels and permit them to be easily folded relative to each other in order to line the main PCM layer, comprising the cool packs 9, 10 and 11. This further bonding additionally provides a number of smaller bonds 18 which provide the barrier PCM layer 12 of FIG. 2 with a quilted effect, with the phase change material within the envelope constrained in small pockets 19 defined by the bonds 18, which ensure the phase change material remains uniformly distributed throughout the barrier PCM layer 12.

In an alternative arrangement, and again with reference to FIG. 2, the barrier PCM layer 12 could be created by thermoforming a lower laminate sheet, such as a polyamide/polyethylene laminate, of a semi rigid construction into a mould, to produce a plurality of 3 mm to 8 mm deep recesses in the laminate which are subsequently filled with the Tetradecane. A top film layer of the same or a similar laminate could then be positioned over the lower laminate and bonded by any known technique, which may be heat or radio frequency welding, to form the small closed pockets 19 of FIG. 2 and to also create the living hinges 17, which define the six panels and permit them to be easily folded relative to each other in order to line the main PCM layer, comprising the cool packs 9, 10 and 11.

Referring to FIG. 3, there is illustrated an alternative barrier PCM layer 12 to that shown in FIG. 2. This may be formed from two vinyl sheets, again formed in the shape of a cross as shown. Here though, before the vinyl sheets are bonded together to form the envelope of the barrier PCM layer, six pouches are first formed. Each pouch comprises a capillary sheet 20 of a 6 mm thick woven polypropylene absorbent, sandwiched between two sheets of a polyamide/polyethylene laminate, which two laminated sheets are bonded together around their edges and filled with Tetradecane before being sealed. The pouches may then be placed between the vinyl sheets of the barrier PCM layer 12 before the envelope of the barrier PCM layer 12 can is bonded around its peripheral edge 16 and in the region of the living hinges 17, shown in FIG. 3, to form the living hinges 17 and defining the six panels of the barrier PCM layer 12, with the phase change material being evenly distributed between the panels 15a, 15b, 15c.

As a further alternative, and again with reference to FIG. 3, the barrier PCM layer 12 could be created by thermoforming a lower laminate sheet, such as a polyamide/polyethylene laminate, into a mould to produce a plurality of 3 mm to 8 mm recesses, into each of which a capillary sheet 20 is placed before being filled with the Tetradecane. A top film layer of the same or a similar laminate could then be positioned over the lower laminate and bonded, by any known technique, which may be heat or radio frequency welding, to form closed cells and also to create living hinges 17 which define the six panels and permit them to be easily folded relative to each other, in order to line the main PCM layer, comprising the cool packs 9, 10 and 11.

The capillary action of the capillary sheets 20 ensures that the phase change material is distributed relatively evenly through each of the panels 15a, 15b, 15c of the barrier PCM layer 12, even when these are arranged vertically, as for example in the case of the panels 15b, which line the wall cool packs 9.

Referring again to FIG. 1, in use the cool packs 9, 10 and 11 forming the main PCM layer and the barrier PCM layer 12 are removed from the container 1 and the cool packs 9, 10 and 11 are chilled to around −18° C., in order to cause the phase change material within the cool packs 9, 10 and 11 to release energy and transition to a solid state, whilst the barrier PCM layer 12 is left at room temperature.

When it is desired to ship a product at a temperature which is to be maintained in the range of 2° C. to 8° C., cool packs 9, 10 and 11 are placed directly in the container 1 without the need to first let them warm up. The barrier PCM layer 12, either as shown in FIG. 2, or as shown in FIG. 3, is then inserted into the container 1, as shown in FIG. 1. A product for transportation may then be placed in void 13, or the void 13 may additionally be lined, for example with a corrugated insert, prior to a product being placed within the container 1. When the product has been placed in the container 1, the lid portion 14 of the barrier PCM layer 12 is then closed and top cool pack 11 placed on top. A further vacuum insulation panel 22 is then placed on top of the top cool pack 11 and on top of this is placed a lid 23 of expanded polystyrene. Alternatively, the further vacuum insulation panel 22 may be housed in the lid 23 of expanded polystyrene 23. The flaps 3 and 4 of the outer box 2 are then closed and the container 1 is ready for shipping.

The product, to be maintained in the temperature range 2° C. to 8° C., is protected from the initial extreme cold of the cool packs 9, 10, 11 by the barrier PCM layer 12. The phase change energy of the PCM material in the barrier PCM layer is in the range of 12% to 22% of the phase change energy of the PCM material in the main PCM layer 9, 10, 11. This is sufficient to enable the barrier PCM layer 12, via the latent heat of fusion of the phase change material within the barrier PCM layer 12, to provide energy ("sensible heat") to the main PCM layer to bring it up to the temperature at which a phase change occurs, normally about or slightly above 5° C. Thus the temperature of the barrier PCM layer 12 does not drop below this temperature and thus the barrier PCM layer 12 protects a product from being overly chilled. Furthermore, the uniform distribution of the phase change material, in the barrier PCM layer 12, ensures that the product does not experience any localised cold spots.

The present invention has been described with reference to the Figures, by way of example only. It will be appreciated that many modifications may be made which fall within the scope of the invention as defined by the following claims.

The invention claimed is:

1. A thermally insulated container comprising:
a thermally insulating layer defining a first void;
a main PCM layer containing phase change material and located within the first void and defining a second void within the first void; and
a barrier PCM layer containing phase change material and located within the second void and distinct from the main PCM layer, the barrier PCM layer having an average thickness and defining a third void within the second void;
the container being arranged to receive a product for transportation inside of the third void; wherein
the main PCM layer has an average thickness greater than the average thickness of the barrier PCM layer;
the barrier PCM layer comprises an envelope in which the phase change material of the barrier PCM layer is relatively evenly distributed; and
the envelope has a quilted configuration by being divided into a plurality of discrete pockets, each pocket containing a volume of the phase change material.

2. The thermally insulated container as claimed in claim 1, wherein the envelope is formed from two sheets of flexible material bonded together to divide the envelope into the plurality of discrete pockets.

3. The thermally insulated container as claimed in claim 1, wherein the main PCM layer comprises one or more packs containing phase change material, which packs are formed of a different material to the envelope and are substantially more rigid than the envelope.

4. The thermally insulated container as claimed in claim 1, wherein the barrier PCM layer comprises at least four joined together envelopes, one corresponding to each of four sides of the container.

5. The thermally insulated container as claimed in claim 4, wherein all the envelopes are formed from two sheets of flexible material bonded together to define said envelopes, with the bonds forming living hinges to permit adjacent envelopes to be folded relative to each other to a shape substantially corresponding to that of the second void of the container.

6. The thermally insulated container as claimed in claim 1, wherein the phase change material of the main PCM layer is the same as the phase change material of the barrier PCM layer.

7. The thermally insulated container as claimed in claim 1, wherein the volume of the phase change material of the barrier PCM layer is between 8% and 36% of the volume of the phase change material of the main PCM layer.

8. The thermally insulated container as claimed in claim 1, wherein the volume of the phase change material of the barrier PCM layer is between 12% and 22% of the volume of the phase change material of the main PCM layer.

9. The thermally insulated container as claimed in claim 1, wherein the latent heat of fusion of the phase change material multiplied by the volume of the phase change material of the barrier PCM layer is between 8% and 36% of the latent heat of fusion of the phase change material multiplied by the volume of the phase change material of the main PCM layer.

10. The thermally insulated container as claimed in claim 1, wherein the latent heat of fusion of the phase change material multiplied by the volume of the phase change material of the barrier PCM layer is between 12% and 22% of the latent heat of fusion of the phase change material multiplied by the volume of the phase change material of the main PCM layer.

11. The thermally insulated container as claimed in claim 1, wherein the thermally insulating layer comprises a layer of vacuum insulation panels.

12. The thermally insulated container as claimed in claim 1 wherein the envelope is formed of a thermoplastic material.

13. A method of transporting a product at a relatively constant temperature, the method comprising the steps of:
obtaining a thermally insulated container comprising a thermally insulating layer defining a first void, a main PCM layer containing phase change material and located within the first void and defining a second void within the first void, and a barrier PCM layer containing phase change material and located within the second void and distinct from the main PCM layer, the barrier PCM layer having an average thickness and defining a third void within the second void, the container being arranged to receive a product for transportation inside of the third void; wherein the main PCM layer has an average thickness greater than the average thickness of the barrier PCM layer, the barrier PCM layer comprises an envelope in which the phase change material of the barrier PCM layer is relatively evenly distributed and the envelope has a quilted configuration by being divided into a plurality of discrete pockets, each pocket containing a volume of the phase change material;
chilling the phase change material of the main PCM layer to below −14° C.;
adjusting the temperature of the phase change material of the barrier PCM to above 4° C.;
inserting the barrier PCM layer into the second void defined by the main PCM layer; and
placing the product to be transported into the third void.

14. The method as claimed in claim 13, comprising chilling the phase change material of the main PCM layer to below −14° C. and subsequently inserting the main PCM layer into the second void of the container prior to inserting the barrier PCM layer.

15. The method as claimed in claim 13, wherein the barrier PCM layer is inserted when the phase change material of the barrier PCM layer is at room temperature.

* * * * *